(12) United States Patent
Okuda

(10) Patent No.: US 11,565,910 B2
(45) Date of Patent: Jan. 31, 2023

(54) ELEVATOR DEVICE

(71) Applicant: MITSUBISHI ELECTRIC CORPORATION, Chiyoda-ku (JP)

(72) Inventor: Hiroshi Okuda, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 1155 days.

(21) Appl. No.: 16/078,670

(22) PCT Filed: Apr. 4, 2016

(86) PCT No.: PCT/JP2016/061009
§ 371 (c)(1),
(2) Date: Aug. 22, 2018

(87) PCT Pub. No.: WO2017/175272
PCT Pub. Date: Oct. 12, 2017

(65) Prior Publication Data
US 2019/0084795 A1 Mar. 21, 2019

(51) Int. Cl.
*B66B 3/00* (2006.01)
*B66B 13/30* (2006.01)
(Continued)

(52) U.S. Cl.
CPC ............. *B66B 3/002* (2013.01); *B66B 3/006* (2013.01); *B66B 3/02* (2013.01); *B66B 11/02* (2013.01);
(Continued)

(58) Field of Classification Search
CPC ........... B66B 3/002; B66B 3/006; B66B 3/02; B66B 11/02; B66B 11/0226; B66B 13/00; B66B 13/30; B66B 13/306; B66B 3/026
See application file for complete search history.

(56) References Cited

U.S. PATENT DOCUMENTS 5,004,225 A * 4/1991 Krukovsky ............ A63G 31/16
472/60
6,076,638 A * 6/2000 Gertz ........................ B66B 3/00
472/61
(Continued)

FOREIGN PATENT DOCUMENTS

CA 2 313 916 A1 1/2001
CN 1280949 A 1/2001
(Continued)

OTHER PUBLICATIONS

International Search Report dated Jun. 28, 2016 in PCT/JP2016/061009 filed Apr. 4, 2016.
(Continued)

*Primary Examiner* — Jeffrey Donels
(74) *Attorney, Agent, or Firm* — Oblon, McClelland, Maier & Neustadt, L.L.P.

(57) ABSTRACT

Provided is an elevator device, including: a cage; a car entrance frame including: entrance columns provided at a car entrance of the cage; and an entrance top plate provided on a top side of the car entrance; a car door configured to open and close the car entrance; a projector, which is provided to the car entrance frame so as to be capable of projecting information onto an image display surface provided at a landing when the car door is opened upon arrival of a car at the landing; and a control device configured to control respective operations of the car door and the projector. When the control device controls the car door to open, the control device controls the projector to project the information onto the image display surface.

8 Claims, 7 Drawing Sheets

(51) Int. Cl.
    *B66B 3/02* (2006.01)
    *B66B 11/02* (2006.01)
    *B66B 13/00* (2006.01)

(52) U.S. Cl.
    CPC .......... *B66B 11/0226* (2013.01); *B66B 13/00* (2013.01); *B66B 13/30* (2013.01); *B66B 13/306* (2013.01)

(56) References Cited

U.S. PATENT DOCUMENTS

| | | | | |
|---|---|---|---|---|
| 6,578,675 | B2* | 6/2003 | Wilson | B66B 3/008 187/393 |
| 2006/0077360 | A1* | 4/2006 | Svensson-Hilford | B66B 13/24 353/122 |
| 2016/0318733 | A1* | 11/2016 | Suoranta | B66B 3/006 |
| 2018/0111792 | A1* | 4/2018 | Schach | B66B 1/468 |
| 2021/0070587 | A1* | 3/2021 | Blaiotta | B66B 13/26 |

FOREIGN PATENT DOCUMENTS

| | | |
|---|---|---|
| JP | 58-69683 A | 4/1983 |
| JP | 3-127673 U | 12/1991 |
| JP | 7-215615 A | 8/1995 |
| JP | 9-263368 A | 10/1997 |
| JP | 2008-156066 A | 7/2008 |
| JP | 2010-208814 A | 9/2010 |
| WO | WO 2017/132500 A1 | 11/2007 |
| WO | WO 2009/050807 A1 | 4/2009 |

OTHER PUBLICATIONS

Combined Chinese Office Action and Search Report dated Oct. 31, 2019 in Chinese Patent Application No. 201680084208.3 (with partial unedited computer generated English translation and English translation of Categories of Cited Documents), 13 pages.

Office Action dated Jun. 25, 2019 in corresponding Japanese Patent Application No. 2018-510024 (with English Translation), 6 pages.

Korean Office Action dated Aug. 13, 2019 in Patent Application No. 10-2018-7026623 (with unedited computer generated English translation), 9 pages.

Office Action dated Feb. 19, 2020 in corresponding Korean Patent Application No. 10-2018-7026623 (with English Translation), 9 pages.

* cited by examiner

ELEVATOR DEVICE

CROSS-REFERENCE TO RELATED APPLICATION

This application is a United States national stage application of International Application No. PCT/JP2016/061009, filed Apr. 4, 2016, which designates the United States, and the entire contents of this international application are hereby incorporated herein by reference in entirety.

TECHNICAL FIELD

The present invention relates to an elevator device including a projector, which is provided to a car entrance frame so as to be capable of projecting information onto a landing side when a car door is opened upon arrival of a car at a landing.

BACKGROUND ART

Hitherto, there has been proposed an elevator device which provides operation information to a passenger who is in a car by allowing a projector provided at a certain location in the car, such as a car door, a wall, or a floor in the car, to project the operation information (for example, see Patent Literature 1 and Patent Literature 2).

CITATION LIST

Patent Literature

[PTL 1] JP 2008-156066 A
[PTL 2] JP 2010-208814 A

SUMMARY OF INVENTION

Technical Problem

In the related art described in Patent Literature 1 and Patent Literature 2, a configuration is given so that the operation information can be provided to a passenger who is in the car. Therefore, in terms of the configuration, the operation information cannot be provided to a passenger who waits for arrival of the car at a landing.

As a configuration for providing respective operation information of a plurality of elevators to a passenger who is at a landing where the plurality of elevators are provided, there can be considered a configuration of providing display devices, which are configured to display respective operation information of the elevators, as many as the number of elevators at landings on respective floors. However, when such a configuration is to be employed, it is required that the display devices as many as the number of the elevators be prepared for the landings on respective floors.

The present invention has been made to solve the above-mentioned problem, and has an object to obtain an elevator device which is capable of providing information to a passenger who waits at a landing without providing display devices as many as the number of elevators for landings of respective floors.

Solution to Problem

According to one embodiment of the present invention, there is provided an elevator device, including: a cage; a car entrance frame including: entrance columns provided at a car entrance of the cage; and an entrance top plate provided on a top side of the car entrance; a car door configured to open and close the car entrance; a projector, which is provided to the car entrance frame so as to be capable of projecting information onto an image display surface provided at a landing when the car door is opened upon arrival of a car at the landing; and a control device configured to control respective operations of the car door and the projector, wherein, when the control device controls the car door to open, the control device controls the projector to project the information onto the image display surface.

Advantageous Effects of Invention

According to the present invention, the elevator device which is capable of providing the information to a passenger who waits at the landing can be obtained without providing the display devices as many as the number of elevators for the landings of respective floors.

DESCRIPTION OF EMBODIMENTS

Now, an elevator device according to exemplary embodiments of the present invention is described with reference to the drawings. In the illustration of the drawings, the same components or corresponding components are denoted by the same reference symbols, and the overlapping description thereof is herein omitted.

First Embodiment

Figure 1:
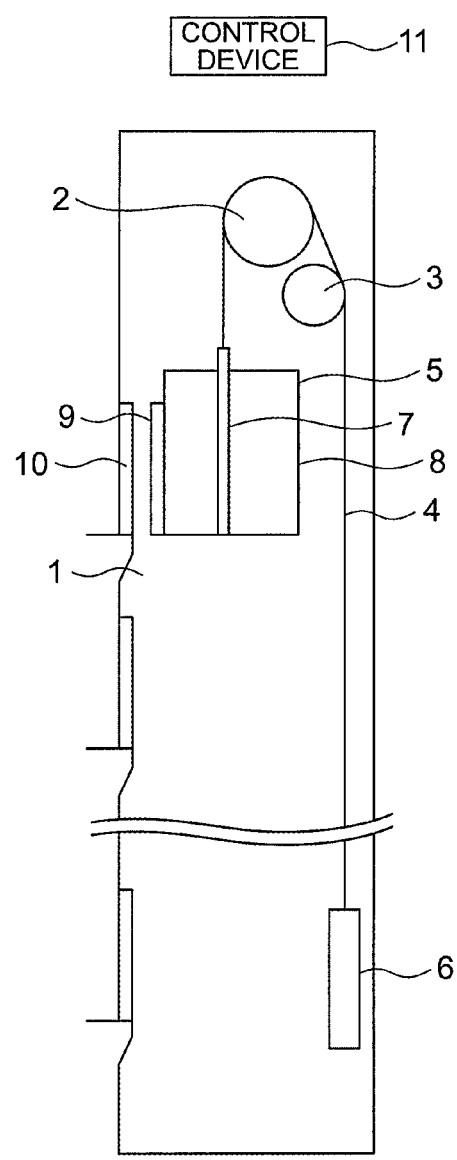
FIG. 1 is a configuration view for illustrating an elevator device according to a first embodiment of the present invention.

FIG. 1 is a configuration view for illustrating an elevator device according to a first embodiment of the present invention. In FIG. 1, a suspension body 4 is stretched around a hoisting machine 2 and a deflection sheave 3. As the suspension body 4, a plurality of ropes or a plurality of belts are used. A car 5 is connected to one end portion of the suspension body 4, and a counterweight 6 is connected to another end portion of the suspension body 4.

The car 5 and the counterweight 6 are suspended in a hoistway 1 by the suspension body 4, and are lifted up and down in the hoistway 1 by drive of the hoisting machine 2. A control device 11 controls the hoisting machine 2 to control an operation of the car 5.

The car 5 includes a car frame 7 and a cage 8. The car frame 7 is connected to the suspension body 4. The cage 8 is supported by the car frame 7. A pair of car doors 9 is provided on a front side of the cage 8. The control device 11 controls the operation of the car 5, and controls opening and closing operations of the car doors 9. At each of landings on a plurality of floors, a pair of landing doors 10 is provided. The landing doors 10 are opened or closed in cooperation with the car doors 9 through engagement of the car doors 9 to the landing doors 10 at the time of arrival of the car 5.

The control device 11 is achieved with, for example, a CPU, which is configured to execute programs stored in a storage device such as a memory, and a processing circuit such as a system LSI.

Figure 2:
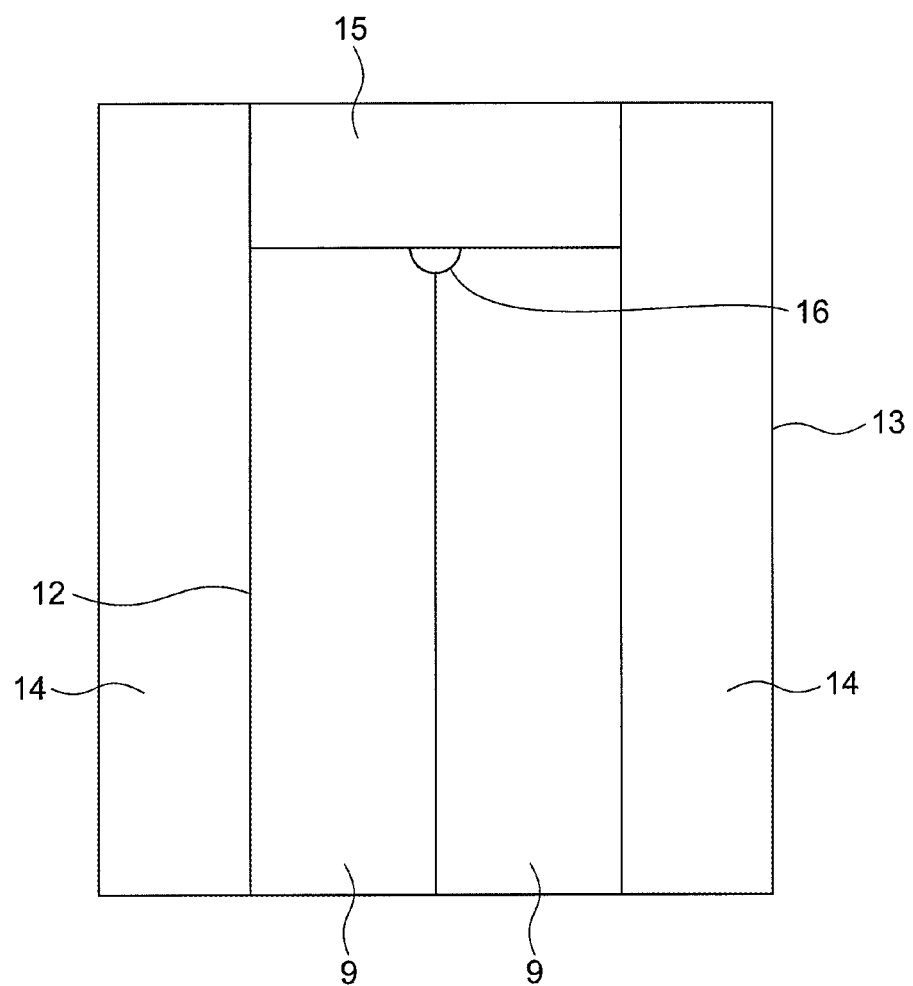
FIG. 2 is a front view for illustrating car doors and a periphery thereof in FIG. 1 as seen from an inside of a cage.

FIG. 2 is a front view of the car doors 9 and a periphery thereof in FIG. 1 as seen from an inside of the cage 8. On a front side of the cage 8, a car entrance 12 is provided. When the car doors 9 move in directions opposite to each other at the time of the opening operation or the closing operation, the car entrance 12 is opened or closed.

A car entrance frame 13 is provided on the right side, the left side, and the top side of the car entrance 12. The car entrance frame 13 includes a pair of entrance columns 14 and an entrance top plate 15. The entrance columns 14 are provided on both the right and left sides of the car entrance 12. The entrance top plate 15 is provided on the top side of the car entrance 12. The entrance columns 14 are arranged in parallel and vertically. The entrance top plate 15 is arranged horizontally between upper end portions of the entrance columns 14. Typically, a car operation panel (not shown) is provided on any one of respective front sides of the pair of entrance columns 14. Further, respective lateral surfaces of the pair of entrance columns 14 are opposed to each other.

A projector 16 is provided to the car entrance frame 13 so as to be capable of projecting information onto a floor of the landing when the car doors 9 are opened upon arrival of the car 5 at the landing. Specifically, the projector 16 is provided on a lower side of the entrance top plate 15 of the car entrance frame 13, and projects information onto the floor of the landing when the car doors 9 are opened. The floor of the landing herein refers to, for example, a floor in an area near a landing entrance 17 described later.

The control device 11 controls an operation of the projector 16. Specifically, the control device 11 controls the projector 16 to start projection simultaneously with start of an opening operation of the car doors 9, and controls the projector 16 to stop projection simultaneously with completion of a closing operation of the car doors 9 or immediately after completion of the closing operation of the car doors 9.

The information herein refers to, for example, operation information to be provided to a passenger who waits for arrival of the car 5 at the landing. For example, as the operation information, a destination floor allocated to the car 5 or an operation direction of the car 5 are projected by the projector 16 onto the floor of the landing.

Figure 3:
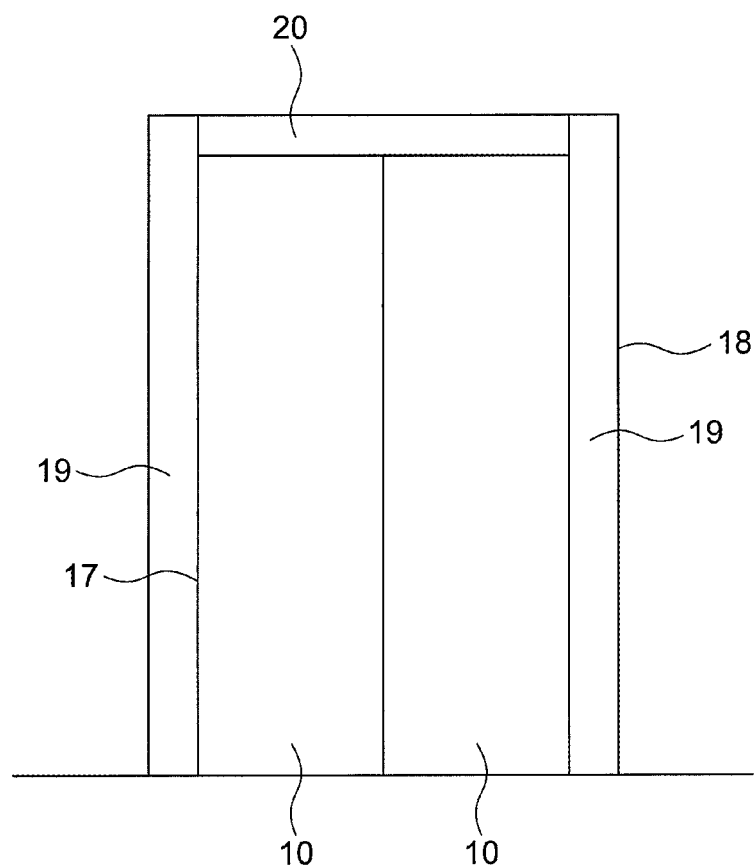
FIG. 3 is a front view for illustrating landing doors and a periphery thereof in FIG. 1 as seen from a landing.

FIG. 3 is a front view for illustrating the landing doors 10 and a periphery thereof in FIG. 1 as seen from the landing. The landing entrance 17 is provided to the landing. When the landing doors 10 move in directions opposite to each other at the time of the opening operation or the closing operation, the landing entrance 17 is opened or closed.

A jamb 18 is provided on the right side, the left side, and the top side of the landing entrance 17. The jamb 18 includes a pair of vertical frames 19 and a head frame 20. The vertical frames 19 are provided on the right side and the left side of the landing entrance 17. The top frame 20 is provided on the top side of the landing entrance 17. The vertical frames 19 are arranged in parallel and vertically. The head frame 20 is arranged horizontally between upper end portions of the vertical frames 19.

Figure 4:
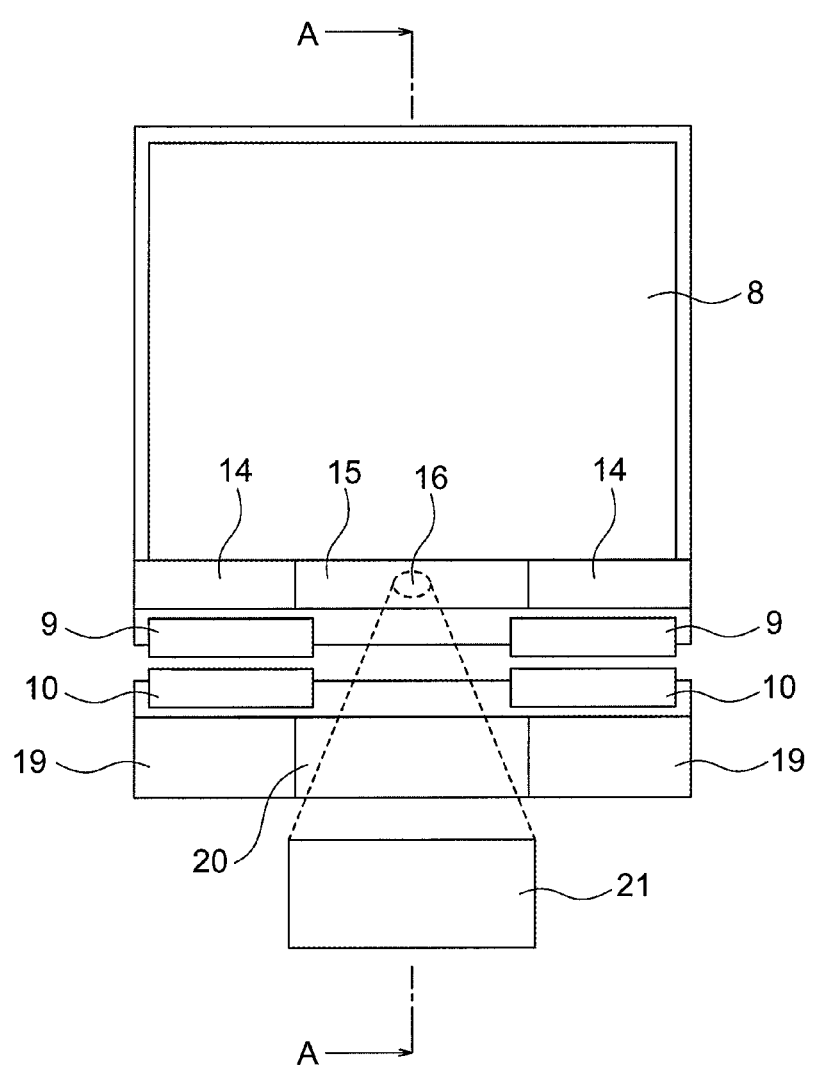
FIG. 4 is a top view for illustrating the elevator device under a state in which the car doors and the landing doors are opened upon arrival of the car in FIG. 1 at the landing.
Figure 5:
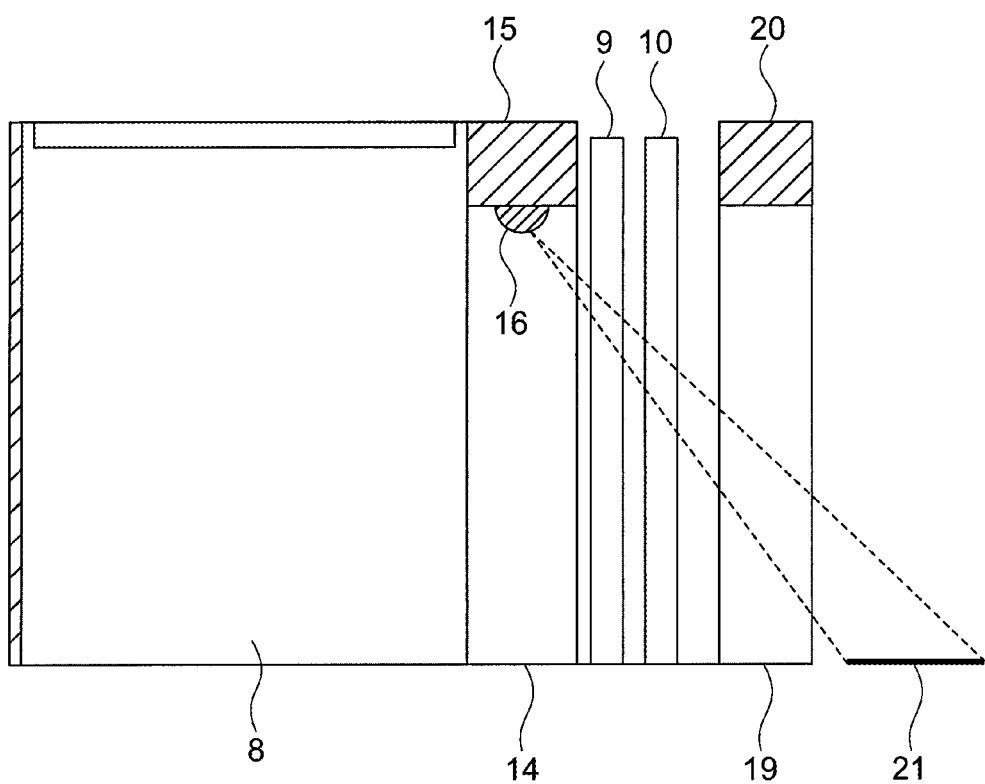
FIG. 5 is a sectional view taken along the line A-A of FIG. 4.

FIG. 4 is a top view for illustrating the elevator device under a state in which the car doors 9 and the landing doors 10 are opened upon arrival of the car 5 in FIG. 1 at the landing. FIG. 5 is a sectional view taken along the line A-A of FIG. 4. In FIG. 4 and FIG. 5, the projector 16 provided on the lower side of the entrance top plate 15 projects information onto a floor of the landing on which an image display surface 21 is provided. It is preferred that the part at which the image display surface 21 is provided be in white color and be processed so that the part causes smaller reflection of light to an extent possible. With this, a passenger who waits at the landing can easily see the image projected from the projector 16.

Figure 6:
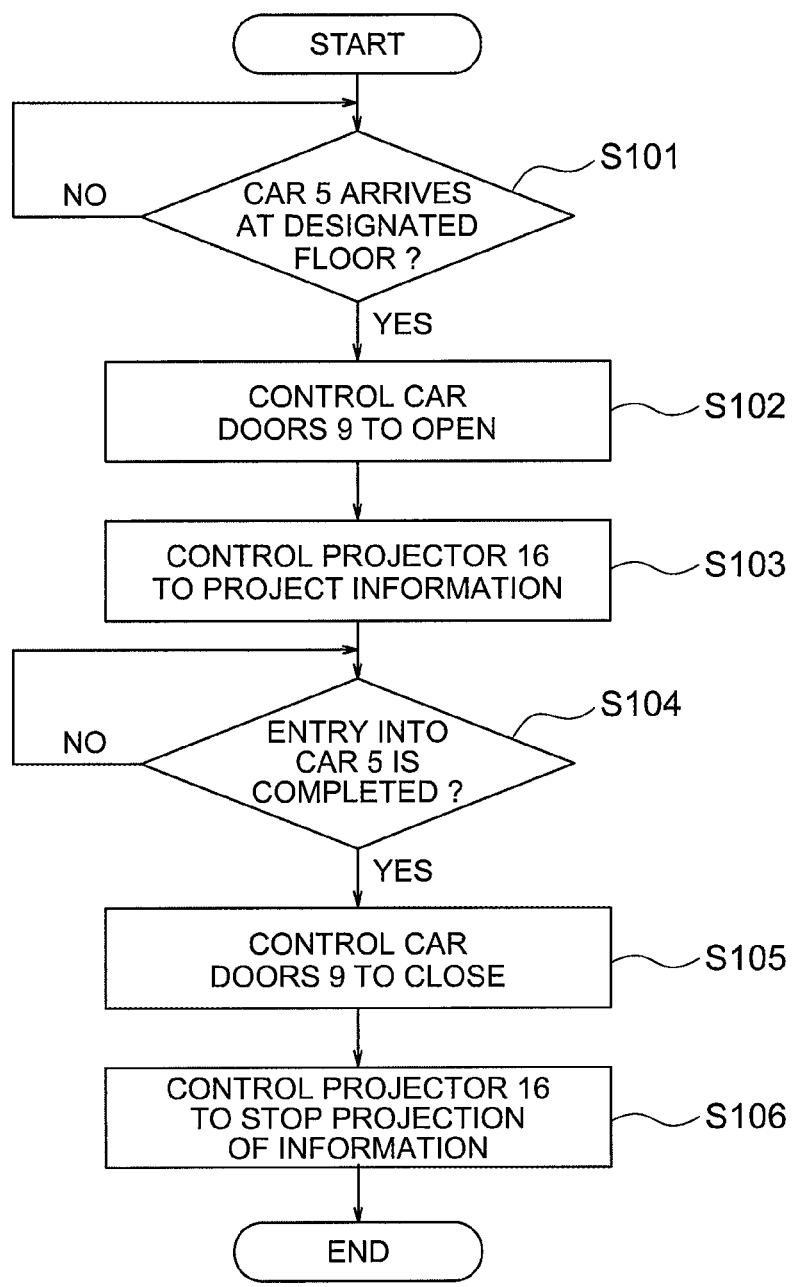
FIG. 6 is a flowchart for illustrating a series of operations of a control device in FIG. 1.

Next, with reference to FIG. 6, description is made of an operation in which the projector 16 projects information onto the image display surface 21 in accordance with control by the control device 11. FIG. 6 is a flowchart for illustrating a series of operations of the control device 11 in FIG. 1. The processing illustrated in the flow chart of FIG. 6 is executed each time a passenger who is at a landing of a designated floor performs an operation to cause a destination floor registration device to register a destination floor of the passenger.

In Step S101, the control device 11 determines whether or not the car 5 allocated in accordance with a registered destination floor has arrived at a designated floor. When it is determined in Step S101 that the car 5 has arrived at the designated floor, the processing proceeds to Step S102. When it is determined that the car 5 has not arrived at the designated floor, the processing of Step S101 is executed again.

In Step S102, the control device 11 controls the car doors 9 to open, and then the processing proceeds to Step S103.

In Step S103, the control device 11 controls the projector 16 to project information, and then the processing proceeds to Step S104.

As described above, when the control device 11 controls the car doors 9 to open, the control device 11 controls the projector 16 to project information onto the image display surface 21.

In Step S104, the control device 11 determines whether or not entry into the car 5 has been completed. When it is determined in Step S104 that the entry into the car 5 has been completed, the processing proceeds to Step S105. When it is determined that the entry into the car 5 has not been completed, the processing of Step S104 is executed again.

As a method of determining whether or not the entry into the car 5 has been completed, for example, there may be employed a method of determining that the entry into the car 5 has been completed based on elapse of a set time period after completion of the opening operation of the car doors 9, and otherwise determining that the entry into the car 5 has not been completed.

In Step S105, the control device 11 controls the car doors 9 to close, and then the processing proceeds to Step S106.

In Step S106, the control device 11 controls the projector 16 to stop projection of information, and then the series of processing is ended.

As described above, when the control device 11 controls the car door 9 to close, the control device 11 controls the projector 16 to stop projection of the information onto the image display surface 21.

According to the first embodiment, the elevator device includes the projector, which is provided to the car entrance frame so as to be capable of projecting information onto the image display surface provided on the landing when the car doors are opened upon arrival of the car at the landing, and the control device configured to control respective operations of the car doors and the projector. Further, when the control device controls the car doors to open, the control device controls the projector to project information onto the image display surface.

In the first embodiment, description has been made of an exemplary case in which the image display surface is provided on the floor of the landing and in which the projector is provided to the entrance top plate of the car entrance frame so as to be capable of projecting information onto the image display surface.

With the configuration described above, even without preparation of display devices as many as the number of elevators to landings of each floor, information can be provided to a passenger who waits at the landing by preparing projectors as many as the number of cars. Further, with the configuration described above, it is only required that the projector be installed in the car. Thus, the configuration described above can be achieved in an inexpensive manner as compared to the configuration of installing display devices as many as the number of elevators for each of the landings of respective floors.

Further, when a light emission port of the projector is turnable, and the projector has a function of adjusting wide-angle and zoom, a projection position and a size of an image to be projected can be freely adjusted in accordance with layout of a landing, a size of the landing, and a depth of the jamb provided at the landing. Further, when the projector has a function of adjusting brightness of the projected image, the brightness of the projected image can be adjusted depending on illuminance of the landing. Through use of the projector having such functions, the elevator device may be suited to various conditions such as a size of an elevator and specification and structure of construction.

Second Embodiment

In the first embodiment, description has been made of the configuration in which the projector 16 is provided to the entrance top plate 15 of the car entrance frame 13. In a second embodiment of the present invention, description is made of a configuration in which the projector 16 is provided to the entrance column 14 of the car entrance frame 13. In the second embodiment, description of features which are the same as those of the first embodiment is omitted, and features which are different from those of the first embodiment are mainly described.

Figure 7:
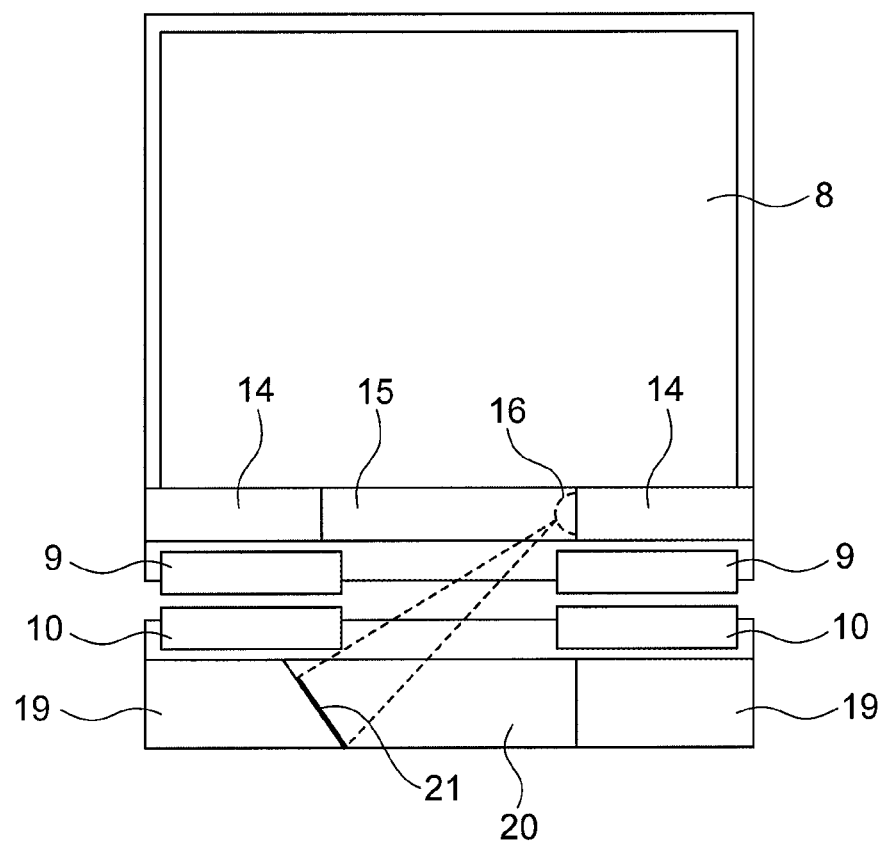
FIG. 7 is a top view for illustrating an elevator device according to a second embodiment of the present invention.

FIG. 7 is a top view of an elevator device according to the second embodiment of the present invention. Similarly to FIG. 4, FIG. 7 is a top view of the elevator device under a state in which the car doors 9 and the landing doors 10 are opened upon arrival of the car 5 at the landing.

In FIG. 7, the projector 16 is provided on the lateral surface of the entrance column 14. In this case, a lateral surface on one of the pair of vertical frames 19 of the jamb 18, which faces the projector 16, serves as the image display surface 21, and the projector 16 projects information onto the image display surface 21.

The shape of the one vertical frame 19 is adjusted so that the lateral surface thereof facing the projector 16 is opposed to the projector 16. Through such adjustment, the image display surface 21 can be provided on the lateral surface of the vertical frame 19. It is preferred that the shape of the vertical frame 19 and the position of the projector 16 be adjusted so as to cause light projected from the projector 16 to perpendicularly enter on the image display surface 21.

According to the second embodiment, as compared to the first embodiment, the image display surface is provided on the vertical frame of the jamb of the landing, and the projector is provided to the entrance column of the car entrance frame so as to be capable of projecting information onto the image display surface. With this configuration, the same effect as that of the first embodiment can be attained.

The invention claimed is:

1. An elevator device, comprising:
   a cage;
   a car entrance frame including:
      entrance columns provided at a car entrance of the cage; and
      an entrance top plate provided on a top side of the car entrance;
   a car door configured to open and close the car entrance;
   a projector, which is provided to the car entrance frame so as to be capable of projecting information onto an image display surface provided at a landing when the car door is opened upon arrival of a car at the landing; and
   a control device configured to control respective operations of the car door and the projector,
   wherein, when the control device controls the car door to open, the control device controls the projector to project the information onto the image display surface.

2. The elevator device according to claim 1,
   wherein the image display surface is provided on a floor of the landing, and
   wherein the projector is provided to the entrance top plate of the car entrance frame so as to be capable of projecting the information onto the image display surface.

3. The elevator device according to claim 1, further comprising a jamb including:
   vertical frames provided at a landing entrance of the landing; and
   a head frame provided at a top side of the landing entrance,
   wherein the image display surface is provided on the vertical frame of the jamb of the landing, and
   wherein the projector is provided to the entrance column of the car entrance frame so as to be capable of projecting the information onto the image display surface.

4. The elevator device according to claim 3, wherein light projected from the projector enters perpendicularly on the image display surface.

5. The elevator device according to claim 1, wherein, when the control device controls the car door to close, the control device controls the projector to stop projection of the information onto the image display surface.

6. The elevator device according to claim 2, wherein, when the control device controls the car door to close, the control device controls the projector to stop projection of the information onto the image display surface.

7. The elevator device according to claim 3, wherein, when the control device controls the car door to close, the control device controls the projector to stop projection of the information onto the image display surface.

8. The elevator device according to claim 4, wherein, when the control device controls the car door to close, the control device controls the projector to stop projection of the information onto the image display surface.

* * * * *